US010108616B2

(12) United States Patent
Allen et al.

(10) Patent No.: US 10,108,616 B2
(45) Date of Patent: Oct. 23, 2018

(54) PROBABILISTIC LINK STRENGTH REDUCTION

(75) Inventors: Thomas Bradley Allen, Henderson, NV (US); Brian Eugene Macy, Henderson, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1510 days.

(21) Appl. No.: 12/505,348

(22) Filed: Jul. 17, 2009

(65) Prior Publication Data

US 2011/0016114 A1    Jan. 20, 2011

(51) Int. Cl.
    *G06F 17/30*    (2006.01)
(52) U.S. Cl.
    CPC .............. *G06F 17/30014* (2013.01)
(58) Field of Classification Search
    USPC .............. 707/726, 780, 999.005, 797, 798; 370/252, 255, 324
    See application file for complete search history.

(56) References Cited

U.S. PATENT DOCUMENTS

| | | | | |
|---|---|---|---|---|
| 6,556,983 B1 * | 4/2003 | Altschuler et al. | | 706/55 |
| 6,873,937 B2 | 3/2005 | De Costa | | |
| 7,433,885 B2 | 10/2008 | Jones | | |
| 8,203,954 B1 * | 6/2012 | Patel | H04L 45/00 | 370/235 |
| 8,316,060 B1 * | 11/2012 | Snyder, II | G06F 17/30958 | 707/797 |
| 2002/0133483 A1 | 9/2002 | Juergen et al. | | |
| 2004/0202119 A1 * | 10/2004 | Edge | | 370/324 |
| 2005/0171946 A1 * | 8/2005 | Maim | G06F 17/30882 | |
| 2006/0282455 A1 * | 12/2006 | Lee | G06F 17/30864 | |
| 2008/0140655 A1 * | 6/2008 | Hoos et al. | | 707/6 |
| 2008/0147669 A1 * | 6/2008 | Liu et al. | | 707/10 |
| 2008/0189330 A1 * | 8/2008 | Hoos | G06F 17/30743 | |
| 2009/0013033 A1 * | 1/2009 | Converse | G06F 17/30882 | 709/203 |
| 2009/0248709 A1 * | 10/2009 | Fuhrmann et al. | | 707/100 |
| 2009/0299990 A1 * | 12/2009 | Setlur et al. | | 707/5 |
| 2010/0073374 A1 * | 3/2010 | Gao | G06F 17/30864 | 345/440 |

(Continued)

OTHER PUBLICATIONS

Middelhoek, et al. "Technical Papers, From VHDL to Efficient and First-Time-Right Designs: A Formal Approach," ACM Transactions on Design Automation of Electric Systems, vol. 1. No. 2 (Apr. 1996), pp. 205-250.

(Continued)

*Primary Examiner* — Syling Yen
*Assistant Examiner* — Bao Tran
(74) *Attorney, Agent, or Firm* — Patterson + Sheridan, LLP

(57) ABSTRACT

Techniques are disclosed for resolving relationships in a relationship graph of identities. A strength of at least one link from a node of the relationship graph may be reduced, based on at least a count of the links from the node. Further, the reduction may be based on one or more predefined threshold counts. The node having a reduced link strength may be evaluated to identify whether a relationship between the node and a specified node meets predefined criteria for a relationship of interest. A user may be alerted of any identified relationship.

25 Claims, 5 Drawing Sheets

(56) References Cited

U.S. PATENT DOCUMENTS

| | | | | |
|---|---|---|---|---|
| 2010/0079460 | A1* | 4/2010 | Breeds et al. | 345/440 |
| 2010/0161662 | A1* | 6/2010 | Jonas et al. | 707/780 |
| 2010/0299065 | A1* | 11/2010 | Mays | 701/209 |
| 2011/0080851 | A1* | 4/2011 | Wan et al. | 370/255 |
| 2011/0164527 | A1* | 7/2011 | Mishra et al. | 370/252 |
| 2013/0254192 | A1* | 9/2013 | Work et al. | 707/732 |

OTHER PUBLICATIONS

Perera, et al. "A Delta-Driven Execution Model for Semantic Computing".

* cited by examiner

PROBABILISTIC LINK STRENGTH REDUCTION

BACKGROUND OF THE INVENTION

Field of the Invention

Embodiments of the invention relate to techniques for relationship resolution. More specifically, embodiments of the invention relate to pruning a relationship graph of identities for relationship resolution.

Description of the Related Art

Identity resolution applications typically perform one or both of identity resolution and relationship resolution. Identity resolution attempts to answer the question "Who is who?"—i.e., determines whether multiple records that appear to describe different identities actually refer to the same entity (e.g., individual). For example, records identifying two women with different last names may in fact refer to the same woman having both a familial surname and a married surname. Relationship resolution attempts to answer the question "Who knows whom?" in order to determine benefits and/or risks of relationships among identities, such as customers, employees, vendors, and so forth, e.g., by cross-referencing data from various sources. For example, a relationship may be identified between two individuals sharing a common address or telephone number. An example of an identity resolution application is Relationship Resolution, available from International Business Machines Corp. (IBM®) of Armonk, N.Y.

An identity resolution application typically traverses a relationship graph of identities to identify relationships of interest. The relationship graph may include nodes, each node representing an identity (such as an individual, an organization, etc.). In traversing the relationship graph, certain nodes of the relationship graph may turn out to be very "popular" (i.e., have many links to other nodes). The value in traversing through a node with many relationships is typically diminished. For example, an identity resolution application typically follows every link of a relationship graph. Following every link from a node with many links, however, may hinder performance of the identity resolution application while adding little value to the traversal.

SUMMARY OF THE INVENTION

One embodiment of the invention includes a method for evaluating a relationship graph of identities for relationship resolution, the method including configuring one or more processors to perform an operation. The operation may generally include counting a number of links from a node of the relationship graph of identities for identity resolution, up to a first predefined threshold. And also include reducing, for each additional link exceeding the first predefined threshold and not exceeding a second predefined threshold, the strength of at least one link from the node to generate a pruned relationship graph. The operation may further include traversing the pruned relationship graph to identify a relationship between two nodes of the relationship graph that meets predefined criteria for relationships.

Another embodiment of the invention includes a computer readable storage medium containing a program, which, when executed on a processor, performs an operation for evaluating a relationship graph of identities for relationship resolution. The operation may generally include counting a number of links from a node of the relationship graph of identities for identity resolution, up to a first predefined threshold. And reducing, for each additional link exceeding the first predefined threshold and not exceeding a second predefined threshold, the strength of at least one link from the node to generate a pruned relationship graph. The operation may further include traversing the pruned relationship graph to identify a relationship between two nodes of the relationship graph that meets predefined criteria for relationships.

Still another embodiment of the invention includes a system having a processor and a memory containing a program, which when executed by the processor is configured to perform an operation for evaluating a relationship graph of identities for relationship resolution. The operation may generally include counting a number of links from a node of the relationship graph of identities for identity resolution, up to a first predefined threshold. And also include reducing, for each additional link exceeding the first predefined threshold and not exceeding a second predefined threshold, the strength of at least one link from the node to generate a pruned relationship graph. The operation may further include traversing the pruned relationship graph to identify a relationship between two nodes of the relationship graph that meets predefined criteria for relationships.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
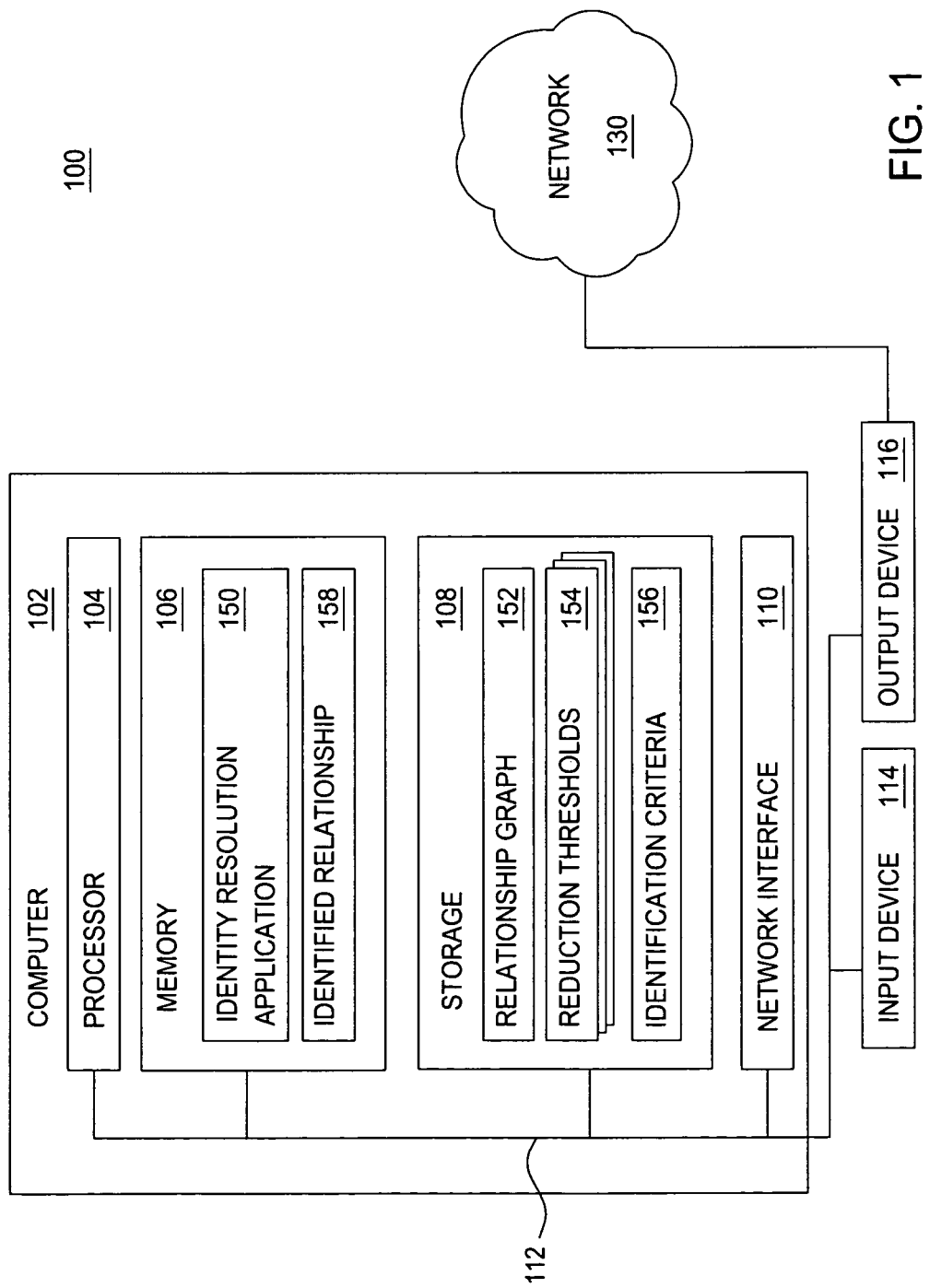
FIG. 1 is a block diagram illustrating a system for pruning a relationship graph of identities for relationship resolution, according to one embodiment of the invention.

Embodiments of the present invention generally provide techniques for relationship resolution. One embodiment of the invention provides an application for identity resolution. The application may traverse a relationship graph to identity relationships of interest. The application may more efficiently traverse a relationship graph having nodes with a large number of links to other nodes. For example, the relationship graph may be generated from newspaper articles. Specifically, the relationship graph may include nodes representing every identity (e.g., individual) named in newspaper articles over the past two years. The relationship graph may also include a link (i.e., between two nodes) for every pair of individuals named in a single newspaper article. Often, certain individuals (e.g., "President George W. Bush") may appear in many newspaper articles. Treating links from these individuals equally (i.e., relative to links from other individuals) may overvalue strengths of the links from these individuals. The strength of a link between two nodes refers to a value representing a strength and/or likelihood of a relationship between two individuals represented by the two nodes. In one embodiment, when traversing the relationship graph, the application may reduce the strength of a link from a node, commensurate with a count of links from the node. In effect, the application may prune one or more parts of the relationship graph from being fully traversed. Specifically, one or more links, by virtue of the reduced strengths of the links, may be disregarded by the application as failing to satisfy predefined criteria for traversal. Thus, the application may prune the relationship graph of one or more links from traversal. Accordingly, the application may more efficiently traverse such a pruned relationship graph to identify relationships of interest to a user.

Further, one embodiment of the invention processes inbound identity records and generates alerts based on relevant identities, conditions, activities, or events. The process of resolving identity records and detecting relationships between identities may be performed using a predetermined or configurable identity resolution rules. Typically, relationships between two identities are derived from information in identity records that indicate a relationship between the two identities. (e.g., a shared address, employer, telephone number, etc.). Two examples of such rules include the following:

If the inbound identity record has a matching "Social Security Number" and close "Full Name" to an existing identity, then resolve the new identity to the existing identity.

If the inbound identity record has a matching "Phone Number" to an existing identity, then create a relationship between the identity of the inbound identity record and the one with the matching phone number.

The first rule adds a new inbound record to an existing identity, where the second creates a relationship between two identities based on the inbound record. Of course, the identity resolution rules may be tailored based on the type of inbound identity records and to suit the needs of a particular case.

In one embodiment, the identity resolution application may also include rules for detecting relevant identities, identities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an identity with an assigned role of "Employee" has a strong relationship to an identity with an assigned role of "Vendor"). As another example, an alert rule may be defined as a combination of both methods (e.g., alert whenever an identity with the "Nevada Gaming Black List" role also has the "Hotel Guest" role and the hotel involved is located in the state of "Nevada"). Of course, the relevance rules used may be tailored to suit the needs of a particular case.

In one embodiment, the identity resolution application generates an alert when the existence of a particular identity record (typically an inbound record being processed) causes some condition to be satisfied that is relevant in some way and that may require additional scrutiny by a user (e.g., a business analyst, an investigator of a police department, etc.). The result of these processes is typically a list of alerts about identities that should be examined by the user. Such alerts may assist the user in identifying both benefits (e.g., potential opportunities) and risks (e.g., potential threats and/or fraud).

In one embodiment, the identity resolution application may more efficiently traverse a relationship graph to identify relationships of interest to a user and to generate alerts for the identified relationships. When traversing the relationship graph, the identity resolution application may reduce the strength of a link from a node, commensurate with a count of links from the node. That is, the application may prune one or more parts of the relationship graph from being fully traversed. Accordingly, the application may more efficiently traverse such a pruned relationship graph to identify relationships of interest to a user and to generate alerts for the identified relationships.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for pruning a relationship graph of identities for relationship resolution, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an identity resolution application 150 and identified relationships 158. The storage 108 of the computer 102 includes a relationship graph 152, resolution thresholds 154, and identification criteria 156. In another embodiment, the identity resolution application 150 generates a relationship graph 152 in the memory 106, while the storage 108 records previously identified relationships. FIGS. 2 through 5 and associated descriptions detail the structure and operation of the identity resolution application 150 running on the computer 102.

Figure 2:
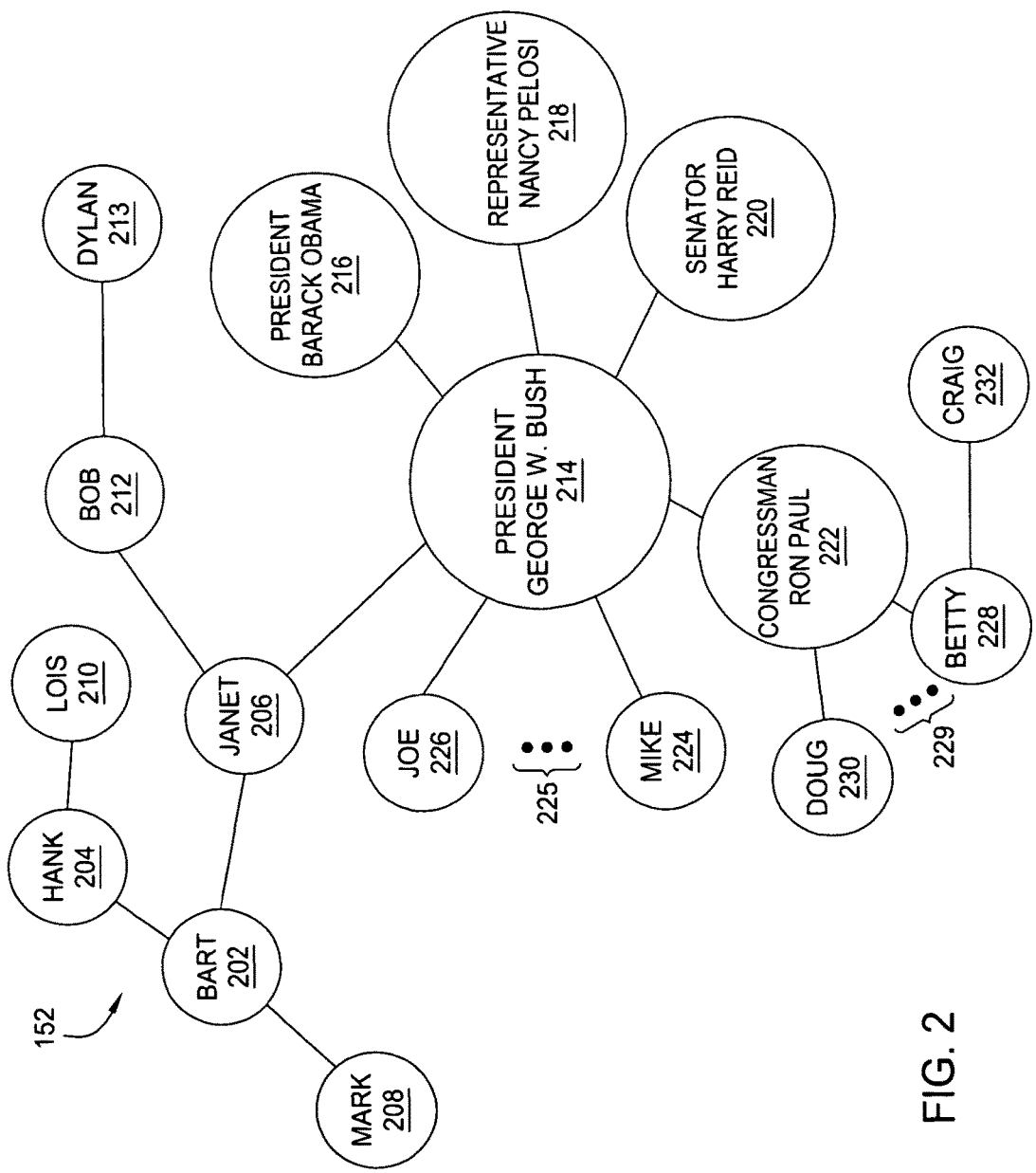
FIG. 2 is a diagram illustrating a relationship graph, according to one embodiment of the invention.

FIG. 2 is a diagram 200 illustrating an example of the relationship graph 152 of FIG. 1, according to one embodiment of the invention. As shown, the relationship graph 152 includes seventeen nodes 202-232, each representing an identity. Further, the relationship graph 152 includes links among the seventeen nodes, each link representing a relationship between two identities. Continuing the example given previously, suppose the relationship graph 152 includes nodes representing every individual named in newspaper articles of a particular newspaper over the past two years. Further, suppose the relationship graph 152 includes a link for (the respective nodes of) every two identities named in the same newspaper article. For example, a link between Bart 202 and Janet 206 indicates that Bart 202 and Janet 206 appear together in at least one newspaper article.

The nodes of FIG. 2 are shown as follows. Bart 202 links to Janet 206, Hank 204, and Mark 208. Hank 204 also links to Lois 210. Janet also links to Bob 212 and President George W. Bush 214. Bob 212 also links to Dylan 213. In addition, President George W. Bush 214 links to President Barack Obama 216, Representative Nancy Pelosi 218, Senator Harry Reid 220, Congressman Ron Paul 222, Mike 224, and Joe 226. President George W. Bush 214 may also link to other nodes 225. Congressman Ron Paul 222 also links to Betty 228 and Doug 230. Congressman Ron Paul 222 may also link to other nodes 229. Betty 228 also links to Craig 232.

In one embodiment, the identity resolution application 150 traverses the relationship graph 152 (e.g., of FIG. 2) to identify relationships of interest among identities represented by the relationship graph 152. For example, in investigating a bank robbery, a police department may decide to mine newspaper articles to discover new leads. The police department may already have interviewed several individuals about the bank robbery, such as a security guard of the robbed bank. Suppose Bart is the security guard of the robbed bank. As shown in FIG. 2, Bart is represented as a node 202 in the relationship graph 152. Specifically, the police department may be interested in discovering individuals Bart may be associated with (i.e., based on the newspaper articles), e.g., for further investigation and/or questioning of those discovered individuals.

For example, one newspaper article may describe Bart 202 and Janet 206 as siblings participating in a local marathon. Another newspaper article may describe Janet 206 and Bob 212 as living together. This suggests that Bart 202 may know Bob 212. If further investigation reveals that Bob 212 has a criminal history, the police department may wish to question Bob 212 about the robbery.

However, some individuals may appear in newspaper articles with a higher frequency than a typical individual.

For example, these individuals may include politicians, celebrities, other high-profile members of the public, etc. Due to the regularity with which these individuals may be mentioned in the newspaper articles, the nodes for these individuals in the relationship graph 152 may have many links to other nodes. A node with many links to other nodes may generally be referred to as a "popular" node.

While the terms "link strength" and "relationship strength" may both be used herein to describe a strength of a link between two nodes of the relationship graph 152, the former term emphasizes an association between the two nodes in the relationship graph 152, while the latter term emphasizes an association between two individuals represented by the two nodes. For example, the latter term may represent an extent to which (or likelihood that) two individuals represented by the two nodes actually know each other, according to one embodiment.

Generally, the relationship strength between two nodes becomes weaker as one or both of the two nodes become more popular. Further, if the two nodes are not linked directly to one another, the relationship strength between the two nodes becomes weaker as one or more intermediate nodes (i.e., nodes through which the two nodes are linked) become more popular. Consequently, traversal through popular nodes may provide little to no value to the identity resolution application 150 (i.e., for identifying relationships of interest).

For example, suppose comments by Janet 206 appear in a newspaper article (e.g., comments on a State of the Union address by President George W. Bush 202). Further, suppose that comments by Joe 226 appear in another newspaper article (e.g., comments on a commencement address by President George W. Bush 202 at a college graduation ceremony attended by Joe 226). While the relationship graph 152 may link Joe 226 to Janet 206 and then Bob 202 (e.g., through President George W. Bush 214), the likelihood that Joe 226 actually knows Janet 206 or Bob 202 is low to nil. (Likewise, the likelihood that Joe 226, Janet 206, or Bob 202 actually "know" George W. Bush 202 personally, and vice versa, is low to nil.) Thus, traversing Joe 226 (or any links from Joe 226) may yield little benefit to a search.

As another example, suppose the identity resolution application 150 is traversing the relationship graph 152 to identify individuals related to Bart 202. While both Dylan 213 and Joe 226 are separated from Bart 202 by three degrees (i.e., each link being one degree), processing time spent traversing Joe 226 (and any links therefrom) may instead be better spent than traversing Dylan 213 (and any links therefrom). Further, President George W. Bush 214 may link to many nodes 225 other than Joe 226. Traversing such nodes 225 (and any links therefrom) may also yield less benefit to a search (e.g., than say, traversing Dylan 213). Similarly, if one or more of the nodes 225 are themselves popular (e.g., President Barack Obama 216), traversing such nodes 225 may yield even less benefit to a search. Thus, the relationship strength between two nodes becomes weaker as any of the two nodes (including any intermediate nodes) becomes more popular.

In one embodiment, the identity resolution application 150 may generate a list of identified relationships of interest, according to identification criteria 156 (which may be user-defined). For example, a user may request a list of relationships to Bart 202 that have a relationship strength of 0.60 or greater (e.g., on a max scale of 0.90). Further, in traversing the relationship graph 152, the identity resolution application 150 may, at least initially, treat all links as having the same relationship strength (e.g., 0.90). The relationship strength between two nodes not directly linked may be determined by multiplying all link strengths between the two nodes, according to one embodiment. For instance, if the relationship graph 152 (initially) includes links all having a link strength of 0.90, link strengths between two nodes having greater than one degree of separation may be determined by exponentiation of 0.90. That is, the identity resolution application 150 may determine a link strength between two nodes having greater than one degree of separation (e.g., by multiplying link strengths of all links between the two nodes).

In one embodiment, the determined link strength may be weaker than any of the multiplied link strengths. However, determining a single link strength for two nodes having greater than one degree of separation (and thus having multiple link strengths between the two nodes) is not to be confused with "reducing" a link strength between two adjacent nodes (having only one degree of separation), even if the determined link strength may be weaker than any of the multiple link strengths.

Suppose President George W. Bush 214 links to a total of forty other nodes. The identity resolution application 150 may generate the following list of identified relationships 158 to Bart 202:

TABLE I

Relationships to Bart 202 identified without link strength reduction

| Result | Identity | Relationship strength |
|---|---|---|
| 1 | Hank | 0.90 |
| 2 | Janet | 0.90 |
| 3 | Mark | 0.90 |
| 4 | Lois | $(0.90)^2 = 0.81$ |
| 5 | Bob | $(0.90)^2 = 0.81$ |
| 6 | President George W. Bush | $(0.90)^2 = 0.81$ |
| 7 | Dylan | $(0.90)^3 = 0.729$ |
| 8 | President Barack Obama | $(0.90)^3 = 0.729$ |
| 9 | Representative Nancy Pelosi | $(0.90)^3 = 0.729$ |
| 10 | Senator Harry Reid | $(0.90)^3 = 0.729$ |
| 11 | Congressman Ron Paul | $(0.90)^3 = 0.729$ |
| 12 | Mike | $(0.90)^3 = 0.729$ |
| ... | ... | ... |
| 47 | Joe | $(0.90)^3 = 0.729$ |
| 48 | Betty | $(0.90)^4 = 0.6561$ |
| 49 | Doug | $(0.90)^4 = 0.6561$ |

That is, the identity resolution application 150 may identify forty-nine relationships that satisfy the identification criteria 156 of "relationships to Bart 202 having a relationship strength of 0.60 or greater." Specifically, with each link having a strength of 0.90, individuals at or within four degrees of Bart 202 (e.g., Congressman Ron Paul 222) may be included in the identified relationships 158, because $(0.90)^4$, or 0.6561, satisfies the minimum relationship strength of 0.60 specified by the identification criteria 156. However, individuals at or beyond five degrees of Bart 202 (e.g., Craig 232) may be excluded from the identified relationships 158, because $(0.90)^5$, or 0.59049, fails to satisfy the minimum relationship strength of 0.60.

As explained previously, because President George W. Bush 214 is a popular node of the relationship graph 152, traversing through President George W. Bush 214 may yield little to no value to a search. Specifically, over forty of the forty-nine identified "relationships" to Bart 202 (i.e., those relationships identified via traversing through President George W. Bush 214) are likely to be of little to no value to a user. In another instance, President George W. Bush 214 may have had well over a thousand links to other nodes. In the ongoing example of the police investigation, such identified relationships may overwhelm investigators with leads of minimal value.

In one embodiment, the identity resolution application 150 may reduce the relationship strength of a link from a node, based on a count of links from the node. Further in this regard, the relationship strength of one or more (or even all) links from the node may be reduced. In addition, a rate of the reduction may be defined by any function (e.g., linear, logarithmic, exponential, etc.). In other words, the rate of the reduction need not be constant. The function may also be defined with respect to one or more reduction thresholds 154. That is, the reduction thresholds 154 may, at least in part, control the rate at which relationship strengths are reduced, relative to an increase in popularity of the node. For example, the identity resolution application 150 may begin to reduce the relationship strength of a link from a node, once a first reduction threshold 154 (e.g., "having more than thirty links") is satisfied.

Further, the identity resolution application may cease reducing the relationship strength of a link from a node, once a second reduction threshold 154 (e.g., "having at least fifty links") is satisfied. The second reduction threshold 154 is greater than the first reduction threshold 154 in this case. In one embodiment, the second reduction threshold 154 may, in effect (in conjunction with the defined function), impose a limit on the extent to which link strengths may be reduced (e.g., "no more than 75% of a link strength"). In another embodiment, the second reduction threshold 154 specifies when a link strength is to be reduced to nil (e.g., "nodes having at least fifty links are to have link strengths of zero"). For example, if a termination condition for traversal requires a link strength to be zero, then the relationship graph may be pruned with a second reduction threshold that specifies a full (100%) link strength reduction.

For example, suppose that the rate of reduction is defined to occur linearly, starting at thirty-one links and ending with a hundred-percent reduction at fifty links. In other words, link strengths are reduced linearly in five percent increments between thirty-one links and fifty links. The rate of reduction may be represented by the following function: (link count minus the first threshold) divided by (the second threshold minus the first threshold). In this case, the first threshold is thirty while the second threshold is fifty. Accordingly, the identity resolution application 150, when traversing the relationship graph 152, may reduce link strengths as follows:

TABLE II

Reducing link strengths linearly between thirty-one and fifty links

| Number of links | Original strength | Reduction | Reduced strength |
|---|---|---|---|
| 1 | 0.90 | 0% | 0.90 |
| 2 | 0.90 | 0% | 0.90 |
| ... | ... | ... | ... |
| 29 | 0.90 | 0% | 0.90 |
| 30 | 0.90 | 0% | 0.90 |
| 31 | 0.90 | 5% | 0.855 |
| 32 | 0.90 | 10% | 0.81 |
| 33 | 0.90 | 15% | 0.765 |
| ... | ... | ... | ... |
| 40 | 0.90 | 50% | 0.45 |
| ... | ... | ... | ... |
| 49 | 0.90 | 95% | 0.045 |
| 50 | 0.90 | 100% | 0.00 |
| 51 | 0.90 | 100% | 0.00 |

As shown, the identity resolution application 150 reduces the strength of a link only upon determining that the first reduction threshold 154 (i.e., "having more than thirty links") is met. Further, the identity resolution application 150 fully reduces the strength of a link upon determining that the second reduction threshold 154 (i.e. "having at least fifty links") is also met. Further still, the identity resolution application 150 reduces the strength of a link linearly, based on the extent to which the first threshold 154 is exceeded. For example, the identity resolution application 150 reduces a link strength by five percent for a node having thirty-one links and by fifty percent for a node having forty links.

The identity resolution application 150 may also reduce link strengths based on a standard deviation from an average (e.g., mean) number of links, according to one embodiment. For example, the identity resolution application 150 may compute both the average and the standard deviation of links of the relationship graph 152. The rate of reduction and the reduction thresholds 154 may then be based on the computed average and standard deviation. For example, the identity resolution application 150 may reduce a link strength of a node only upon determining that the node has a link count that exceeds one standard deviation from the mean. Further, the identity resolution application 150 may reduce a link strength commensurately with the extent to which the link count exceeds the mean (e.g., in terms of standard deviations).

In one embodiment, the identity resolution application 150 may prune the relationship graph 150 by reducing the relationship strength of a link from a node, based on a count of links from the node. The identity resolution application 150 may prune the relationship graph 150 when traversing the relationship graph 150. In doing so, the identity resolution application 150 may more efficiently traverse a relationship graph 152 having one or more nodes with a large number of links, to identify relationships of interest. In another embodiment, the identity resolution application 150 may prune the relationship graph 150 prior to traversing the relationship graph 150.

For example, by reducing link strengths according to Table II, the identity resolution application 150 may generate the following identified relationships 158 to Bart:

TABLE III

Relationships to Bart 202 identified with link strength reduction

| Result | Identity | Relationship strength |
|---|---|---|
| 1 | Hank | 0.90 |
| 2 | Janet | 0.90 |
| 3 | Mark | 0.90 |
| 4 | Lois | $(0.90)^2 = 0.81$ |
| 5 | Bob | $(0.90)^2 = 0.81$ |
| 6 | Dylan | $(0.90)^3 = 0.729$ |

That is, in reducing link strengths, the identity resolution application 150 may identify six relationships (instead of the forty-nine relationships of Table I) that satisfy the identification criteria 156 of "relationships to Bart 202 having a relationship strength of 0.60 or greater." In the ongoing example of the police investigation, investigators need not be overwhelmed with leads of minimal value, even when the relationship graph 152 includes one or more popular nodes.

As another example, relationships of questionable value (e.g., between Bart 202 and Joe 226) are excluded by the identity resolution application 150, by virtue of reduced link strengths. For instance, Joe 226, being three degrees away from Bart 202 in the relationship graph 152, has a relationship strength (to Bart) of $(0.90)^3$, or 0.729, which satisfies the identification criteria 156 of 0.60. However, because President George W. Bush 214 has forty links, the links from President George W. Bush 214 to both Janet 206 and to Joe 226 may be reduced by fifty percent (e.g., according to Table II). Thus, Joe 226 has a reduced relationship strength (to Bart) of $0.90*(0.45)^2$, or 0.18225, which fails to satisfy the identification criteria 156 of 0.60. Therefore, in traversing the relationship graph 152, the identity resolution application 150 may exclude Joe 226 from the identified relationships 158, as a result of reducing the relationship strengths of President George W. Bush 214. Similarly, the identity resolution application 150 may also avoid traversing links from Joe (or from President George W. Bush 214) altogether. Thus, the identity resolution application 150 may more efficiently traverse the relationship graph 152.

In one embodiment, the identity resolution application 150 may also modify the relationship graph 150 to include a link for at least one of the identified relationships 158. For example, the relationship graph 150 may be modified to include a link between Bart 202 and Hank 204 (i.e., according to the identified relationships of Table III). In other words, the relationship graph 150 may be modified to reflect the newly identified relationship between Bart 202 and Hank 204. The identity resolution application 150 may also store the identified relationships 158 in the storage 108 (e.g., along with any previously-identified relationships).

Figure 3:
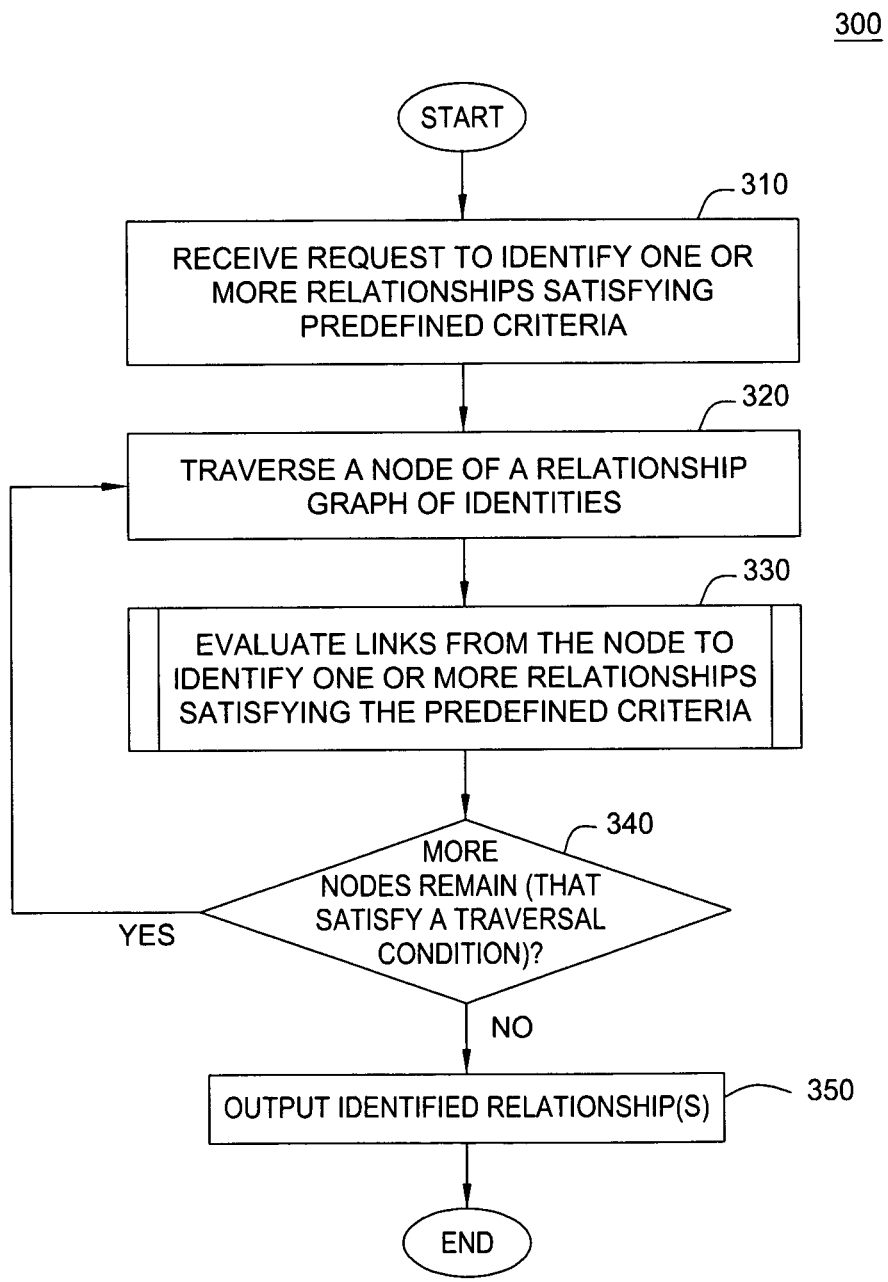
FIG. 3 is a flowchart depicting a method for pruning a relationship graph, according to one embodiment of the invention.

FIG. 3 is a flowchart depicting a method 300 for pruning a relationship graph 152 of FIG. 1, according to one embodiment of the invention. The method 300 may be performed by the identity resolution application (or simply, application) 150 of FIG. 1. As shown, the method 300 begins at step 310, where the application 150 receives a request to identify one or more relationships of interest to a user. In one embodiment, a relationship of interest may be a relationship that satisfies predefined criteria, such as the identification criteria 156 of FIG. 1 (e.g., "having a relationship strength of at least 0.60"). At step 320, the application 150 may traverse a node of the relationship graph 150. Each node of the relationship graph 150 may represent an identity (e.g., an individual). An example of a relationship graph 150 is shown in FIG. 2.

At step 330, the application 150 may evaluate links from the node to identify one or more relationships of interest to the user (e.g., satisfying the predefined criteria). For example, suppose that the application 150 is traversing the relationship graph 150 to identify individuals with a relationship strength to Bart 202 of 0.60 or greater. The application 150 may begin traversing the graph by evaluating links from Bart 202. For example, Janet 206 has a relationship strength of 0.90 to Bart 202. Because 0.90 is greater than the identification criteria 156 of 0.60, the application 150 may add Janet 206 to the identified relationships 158. Evaluating links is further described below in conjunction with FIG. 4.

At step 340, the application 150 determines (e.g., recursively) whether more nodes remain in the relationship graph 152. If so, the method 300 returns to step 320, where the application 150 traverses another node of the relationship graph 152. In one embodiment, the application 150 only traverses a node upon determining that the node satisfies a traversal condition (e.g., the relationship strength of the node to Bart 202 is to be 0.30 or greater). The traversal condition is to be distinguished from the identification criteria 156. The traversal condition specifies which nodes are to be evaluated by the application 150, while the identification criteria 156 specify which relationships (once evaluated by the application 150) are to be included in the identified relationships 158. At step 350, the application 150 may alert a user of the identified relationships 158 (e.g., based on the rules for generating alerts). For example, the application 150 may output the identified relationships 158 to the output device 116. After step 350, the method 300 terminates.

Figure 4:
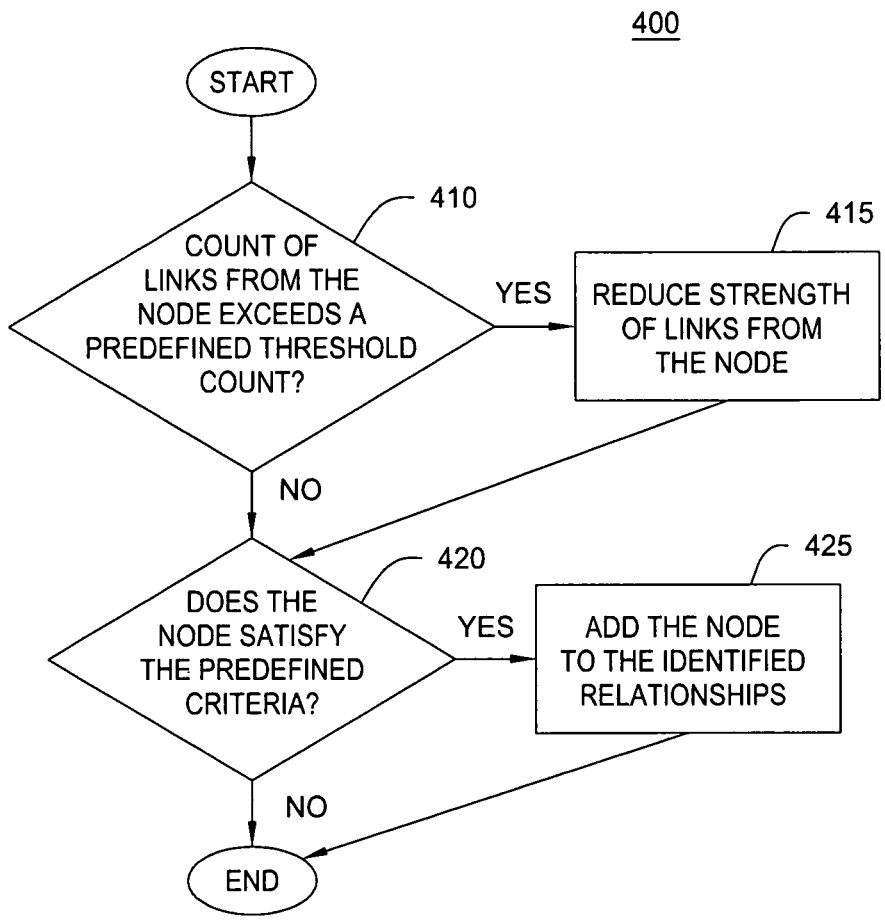
FIG. 4 is a flowchart depicting a method for evaluating links from a node to identify relationships of interest to a user, according to one embodiment.

FIG. 4 is a flowchart depicting a method 400 for evaluating links from a node to identify relationships of interest to the user, according to one embodiment. The method 400 may be performed by the identity resolution application 150 of FIG. 1. Further, the method may correspond to the step 330 of FIG. 3. As shown, the method 400 begins at step 410, where the application 150 counts links from a node of the relationship graph 152. Further, the application 150 determines whether the count exceeds a predefined threshold count (e.g., a first reduction threshold 154 of thirty links). If so, the method 400 proceeds to step 415, where the application 150 reduces the strength of at least one link from the node.

In one embodiment, the application 150 reduces the strength of all links from the node. Further, the application 150 may reduce the strength of a link based on the count (e.g., based on an extent to which the count exceeds the first reduction threshold 154 of thirty links). For example, the application 150 may reduce link strengths by five percent for a node with thirty-one links and by fifty percent for a node with forty links (e.g., according to Table II).

After the step 415 or the step 410, the method 400 proceeds to step 420, where the application 150 determines whether the node satisfies the predefined criteria (e.g., the identification criteria 156—for example, "having a relationship strength of at least 0.60"). If so, the method 400 proceeds to step 425, where the application 150 adds a relationship of the node (e.g., a relationship between the node and a node specified by the predefined criteria of the step 330, such as Bart of Table III) to the identified relationships 158. After the step 425 or the step 420, the method 400 terminates. For example, in evaluating Joe 226, the application 150 may decide to exclude Joe 226 from the identified relationships 158 because the relationship strength between Joe 226 and Bart 202 fails to satisfy the identification criteria 156 of at least 0.60. For instance, the relationship strength between Joe 226 and Bart 202 may have been reduced from 0.729 to 0.18225. This reduction may result from the application 150 having earlier reduced the links from President George W. Bush 214 to both Joe 226 and to Janet 206 when President George W. Bush 214 was evaluated (i.e., in recursively traversing the relationship graph 152).

Figure 5:
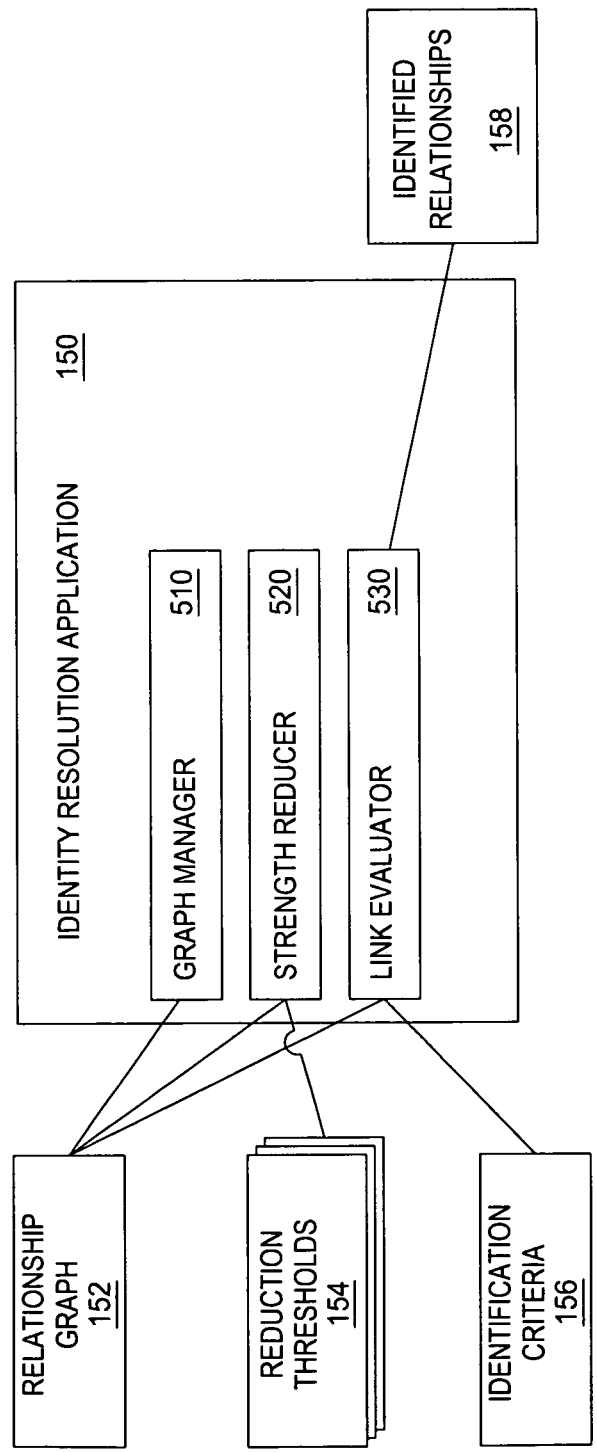
FIG. 5 is a block diagram illustrating components of an identity resolution application, according to one embodiment of the invention.

FIG. 5 is a block diagram illustrating components 500 of the identity resolution application 150 of FIG. 1, according to one embodiment of the invention. As shown, the identity resolution application 150 includes a graph manager 510, a strength reducer 520, and a link evaluator 530.

In one embodiment, the graph manager 510 receives a relationship graph 152. The relationship graph may include nodes representing identities (e.g., individuals). An example of a relationship graph 152 is shown in FIG. 2. In one embodiment, the strength reducer 520 may modify the strength of one or more links of the relationship graph 152, according to one or more reduction thresholds 154. For example, the strength reducer 520 may modify the strength of each link from a node, based on the total number of links from the node. An example of how the strength reducer 520 may modify a link strength is shown in Table II. In one embodiment, the link evaluator 530 assesses nodes of the relationship graph 152 to identify relationships of interest (e.g., based on the identification criteria 156). An example of relationships of interest identified by the link evaluator 530 is shown in Table III. The link evaluator 530 may also alert a user of the identified relationships 158.

Of course, the embodiments described herein are intended to be illustrative and not limiting of the invention, and other embodiments are broadly contemplated. Further, those skilled in the art will recognize that embodiments of the invention may be adapted to support other applications, relationship graphs, reduction rates, reduction functions, reduction thresholds, identification criteria, and traversal conditions. And while embodiments herein are described with reference to a relationship graph generated from newspaper articles, those skilled in the art will recognize that any data source that includes unstructured text may be used to generate the relationship graph. Further, any data source that includes unstructured text may be used to augment an existing relationship graph that is generated from structured data (e.g., employee directories, customer lists, criminal databases, etc.). That is, the relationship graph may be generated from both structured data (describing known relationships) and unstructured text (from which additional relationships are to be mined).

Advantageously, embodiments of the invention provide techniques for resolving relationships in a relationship graph of identities. In one embodiment, an identity resolution application traverses the relationship graph to identify relationships of interest, according to predefined criteria (which may be user-specified). In traversing a node, the identity resolution application may reduce a link strength of at least one link of the node, based on at least a count of the links from the node. The extent of the reduction may be based on a reduction function and/or one or more reduction thresholds (which may be user-specified). The identity resolution application may evaluate whether a relationship between the node (having a reduced link strength) and a specified node satisfies the predefined criteria. By reducing the link strengths of a node based on a link count of the node, the identity resolution application may, in effect, prune one or more parts of the relationship graph from being traversed. Specifically, one or more links, by virtue of the reduced strengths of the links, may be disregarded by the application as failing to satisfy predefined criteria for traversal. Thus, the application may prune the relationship graph of one or more links from traversal. Accordingly, the identity resolution application may more efficiently traverse a relationship graph having one or more nodes with a large number of links, to identify relationships of interest. That is, the identity resolution application may resolve relationships more efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method to identify and exclude false-positive interpersonal relationships from evaluation in an entity resolution system, based on interpersonal relationship totals of individuals, the computer-implemented method comprising:

receiving, from a requesting entity, a request to identify interpersonal relationships satisfying a set of relationship criteria pertaining to a first individual represented in the entity resolution system, each interpersonal relationship comprising a relationship between a respective pair of individuals, wherein the set of relationship criteria is specified in the request;

determining an interpersonal relationship total of a second individual represented in the entity resolution system, the second individual having a plurality of interpersonal relationships, each of which has an associated interpersonal relationship strength, and of which a first interpersonal relationship satisfies a threshold strength for evaluation, the interpersonal relationship total comprising a numerical measure;

determining that the interpersonal relationship strength of each interpersonal relationship of the second individual is overestimated, by determining that the interpersonal relationship total of the second individual exceeds a threshold total for reduction;

upon determining that the interpersonal relationship strength of each interpersonal relationship of the second individual is overestimated, correcting the overestimated interpersonal relationship strength by reducing the interpersonal relationship strength by operation of one or more computer processors and based on a measure by which the interpersonal relationship total of the second individual exceeds the threshold total for reduction, wherein the interpersonal relationship strength of the first interpersonal relationship is reduced below the threshold strength for evaluation, thereby designating the first interpersonal relationship as a false-positive relationship;

identifying one or more interpersonal relationships satisfying the set of relationship criteria, by evaluating, in the entity resolution system, only interpersonal relationships having up to a specified degree of separation from the first individual and to the exclusion of both false-positive relationships and relationships beyond the false-positive relationships, thereby avoiding a processing cost incurred in evaluating the false-positive relationships and the relationships beyond the false-positive relationships; and outputting the identified one or more interpersonal relationships responsive to the request.

2. The computer-implemented method of claim 1, wherein the interpersonal relationship strength of each interpersonal relationship of the second individual is reduced in proportion to an extent by which the interpersonal relationship total of the second individual exceeds the threshold total for reduction.

3. The computer-implemented method of claim 2, wherein the threshold total for reduction comprises a first threshold total for reduction, wherein the interpersonal relationship total of at least one individual is equal to a second threshold total for reduction, wherein the interpersonal relationship strength of each interpersonal relationship of the at least one individual is reduced to nil.

4. The computer-implemented method of claim 3, wherein the threshold total for reduction is selected from at least a threshold interpersonal relationship total and a threshold standard deviation of interpersonal relationship totals of individuals represented in the entity resolution system.

5. The computer-implemented method of claim 4, wherein the set of relationship criteria comprises interpersonal relationships having up to the specified degree of separation from the first individual and satisfying a minimum interpersonal relationship strength for querying.

6. The computer-implemented method of claim 5, wherein an interpersonal relationship strength of two individuals having greater than one degree of separation is determined based on an interpersonal relationship strength of each interpersonal relationship in a sequence of interpersonal relationships that is between the two individuals in the entity resolution system.

7. A non-transitory computer program product to identify and exclude false-positive interpersonal relationships from evaluation in an entity resolution system, based on interpersonal relationship totals of individuals, the non-transitory computer program product comprising:
  a non-transitory computer-readable medium having computer-readable program code embodied therewith, the computer-readable program code executable by one or more computer processors to:
    receive, from a requesting entity, a request to identify interpersonal relationships satisfying a set of relationship criteria pertaining to a first individual represented in the entity resolution system, each interpersonal relationship comprising a relationship between a respective pair of individuals, wherein the set of relationship criteria is specified in the request;
    determine an interpersonal relationship total of a second individual represented in the entity resolution system, the second individual having a plurality of interpersonal relationships, each of which has an associated interpersonal relationship strength, and of which a first interpersonal relationship satisfies a threshold strength for evaluation, the interpersonal relationship total comprising a numerical measure;
    determining that the interpersonal relationship strength of each interpersonal relationship of the second individual is overestimated, by determining that the interpersonal relationship total of the second individual exceeds a threshold total for reduction;
    upon determining that the interpersonal relationship strength of each interpersonal relationship of the second individual is overestimated, correcting the overestimated interpersonal relationship strength by reducing the interpersonal relationship strength by operation of one or more computer processors and based on a measure by which the interpersonal relationship total of the second individual exceeds the threshold total for reduction, wherein the interpersonal relationship strength of the first interpersonal relationship is reduced below the threshold strength for evaluation, thereby designating the first interpersonal relationship as a false-positive relationship;
    identifying one or more interpersonal relationships satisfying the set of relationship criteria, by evaluating, in the entity resolution system, only interpersonal relationships having up to a specified degree of separation from the first individual and to the exclusion of both false-positive relationships and relationships beyond the false-positive relationships, thereby avoiding a processing cost incurred in evaluating the false-positive relationships and the relationships beyond the false-positive relationships; and
    outputting the identified one or more interpersonal relationships responsive to the request.

8. The computer program product of claim 7, wherein the interpersonal relationship strength of each interpersonal relationship of the second individual is reduced in proportion to an extent by which the interpersonal relationship total of the second individual exceeds the threshold total for reduction.

9. The computer program product of claim 8, wherein the threshold total for reduction comprises a first threshold total for reduction, wherein the interpersonal relationship total of at least one individual is equal to a second threshold total for reduction, wherein the interpersonal relationship strength of each interpersonal relationship of the at least one individual is reduced to nil.

10. The computer program product of claim 9, wherein the threshold total for reduction is selected from at least a threshold interpersonal relationship total and a threshold standard deviation of interpersonal relationship totals of individuals represented in the entity resolution system.

11. The computer program product of claim 10, wherein the set of relationship criteria comprises interpersonal relationships having up to the specified degree of separation from the first individual and satisfying a minimum interpersonal relationship strength for querying.

12. The computer program product of claim 11, wherein an interpersonal relationship strength of two individuals having greater than one degree of separation is determined based on an interpersonal relationship strength of each interpersonal relationship in a sequence of interpersonal relationships that is between the two individuals in the entity resolution system.

13. A system to identify and exclude false-positive interpersonal relationships from evaluation in an entity resolution system, based on interpersonal relationship totals of individuals, the system comprising:
  one or more computer processors; and
  a memory containing a program, which when executed by the one or more computer processors is configured to perform an operation comprising:
    receiving, from a requesting entity, a request to identify interpersonal relationships satisfying a set of relationship criteria pertaining to a first individual represented in the entity resolution system, each interpersonal relationship comprising a relationship between a respective pair of individuals, wherein the set of relationship criteria is specified in the request;
    determining an interpersonal relationship total of a second individual represented in the entity resolution system, the second individual having a plurality of interpersonal relationships, each of which has an associated interpersonal relationship strength, and of which a first interpersonal relationship satisfies a threshold strength for evaluation, the interpersonal relationship total comprising a numerical measure;
    determining that the interpersonal relationship strength of each interpersonal relationship of the second individual is overestimated, by determining that the interpersonal relationship total of the second individual exceeds a threshold total for reduction;
    upon determining that the interpersonal relationship strength of each interpersonal relationship of the second individual is overestimated, correcting the overestimated interpersonal relationship strength by reducing the interpersonal relationship strength by operation of one or more computer processors and based on a measure by which the interpersonal relationship total of the second individual exceeds the threshold total for reduction, wherein the interpersonal relationship strength of the first interpersonal relationship is reduced below the threshold strength for evaluation, thereby designating the first interpersonal relationship as a false-positive relationship;
    identifying one or more interpersonal relationships satisfying the set of relationship criteria, by evaluating, in the entity resolution system, only interpersonal relationships having up to a specified degree of separation from the first individual and to the exclusion of both false-positive relationships and relationships beyond the false-positive relationships, thereby avoiding a processing cost incurred in evaluating the false-positive relationships and the relationships beyond the false-positive relationships; and outputting the identified one or more interpersonal relationships responsive to the request.

14. The system of claim 13, wherein a second of the plurality of interpersonal relationships satisfies the threshold strength for evaluation, wherein the interpersonal relationship strength of the second interpersonal relationship is not reduced below the threshold strength for evaluation, wherein evaluating the interpersonal relationships includes evaluating the first interpersonal relationship to the exclusion of the second interpersonal relationship.

15. The system of claim 14, wherein the interpersonal relationship strength of each interpersonal relationship of the second individual is reduced only upon determining that the interpersonal relationship total of the second individual exceeds the threshold total for reduction, wherein the interpersonal relationship strength of each interpersonal relationship of the second individual is reduced by a predefined function of the measure by which the interpersonal relationship total of the second individual exceeds the threshold total for reduction.

16. The system of claim 15, wherein the interpersonal relationship strength of each interpersonal relationship of the second individual is reduced in proportion to an extent by which the interpersonal relationship total of the second individual exceeds the threshold total for reduction, wherein the threshold total for reduction comprises a first threshold total for reduction, wherein the interpersonal relationship total of at least one individual is equal to a second threshold total for reduction, different from the first threshold total for reduction, wherein the interpersonal relationship strength of each interpersonal relationship of the at least one individual is reduced to nil.

17. The system of claim 16, wherein the threshold total for reduction is selected from at least a threshold interpersonal relationship total and a threshold standard deviation of interpersonal relationship totals of individuals represented in the entity resolution system, wherein the set of relationship criteria comprises interpersonal relationships having up to the specified degree of separation from the first individual and satisfying a minimum interpersonal relationship strength for querying.

18. The system of claim 17, wherein an interpersonal relationship strength of two individuals having greater than one degree of separation is determined based on an interpersonal relationship strength of each interpersonal relationship in a sequence of interpersonal relationships that is between the two individuals in the entity resolution system.

19. The system of claim 18, wherein the requesting entity comprises a user, wherein the proportion is, in respective instances, a linear proportion and a non-linear proportion, wherein the degree of separation is specified in the request, wherein each of the threshold strength for evaluation, the first threshold total for reduction, and the second threshold total for reduction is predefined.

20. The system of claim 19, wherein the interpersonal relationship strength of each interpersonal relationship of the second individual is reduced in order to avoid overstating how strongly the second individual is acquainted with a target individual of the respective interpersonal relationship.

21. The system of claim 20 wherein the identified one or more interpersonal relationships are output to the requesting entity responsive to the request, wherein for each interpersonal relationship of the second individual, a respective relationship strength reduction amount is determined based on the predefined function, wherein the relationship strength reduction amount is different for each interpersonal relationship of the second individual.

22. The system of claim 21, wherein the interpersonal relationship strength of each interpersonal relationship of the second individual is reduced in proportion to an extent by which the interpersonal relationship total of the second individual exceeds the first threshold total for reduction, wherein the interpersonal relationship total of a third individual represented in the entity resolution system is equal to the second threshold total for reduction, wherein the interpersonal relationship strength of each interpersonal relationship of the third individual is reduced to nil.

23. The system of claim 22, wherein the predefined function is configured to refrain from reducing interpersonal relationship strength unless the interpersonal relationship total of the second individual exceeds the first threshold total for reduction, wherein the predefined function is further configured to reduce interpersonal relationship strength to nil upon determining that the interpersonal relationship total of the second individual exceeds the second threshold total for reduction, wherein the second threshold total for reduction is greater in measure than the first threshold total for reduction;

wherein a fourth individual represented in the entity resolution system has a first interpersonal relationship satisfying the threshold strength for evaluation, wherein the interpersonal relationship total of the fourth individual does not exceed the first threshold total for reduction, wherein no interpersonal relationship strength of the fourth individual is reduced.

24. A computer-implemented method to identify and exclude false-positive interpersonal relationships from evaluation in an entity resolution system, based on interpersonal relationship totals of individuals, the computer-implemented method comprising:

receiving a request to identify interpersonal relationships satisfying a set of relationship criteria pertaining to a first individual represented in the entity resolution system, each interpersonal relationship comprising a relationship between a respective pair of individuals, wherein the set of relationship criteria is specified in the request, wherein an interpersonal relationship total of a second individual having a plurality of interpersonal relationships is determined, of which each interpersonal relationship has an associated interpersonal relationship strength, the interpersonal relationship total comprising a numerical measure;

determining that the interpersonal relationship strength of each interpersonal relationship of the second individual is overestimated, by determining that the interpersonal relationship total of the second individual exceeds a threshold total for reduction;

upon determining that the interpersonal relationship strength of each interpersonal relationship of the second individual is overestimated, correcting the overestimated interpersonal relationship strength by reducing the interpersonal relationship strength by operation of one or more computer processors and based on a measure by which the interpersonal relationship total of the second individual exceeds the threshold total for reduction, wherein the interpersonal relationship strength of a first of the plurality of interpersonal relationships is reduced below a threshold strength for evaluation, thereby designating the first interpersonal relationship as a false-positive relationship; and wherein only interpersonal relationships having up to a specified degree of separation from the first individual, and to the exclusion of both false-positive relationships and relationships beyond the false-positive relationships are evaluated in identifying one or more interpersonal relationships satisfying the set of relationship criteria, thereby avoiding a processing cost incurred in evaluating the false-positive relationships and the relationships beyond the false-positive relationships, wherein the identified one or more interpersonal relationships are output responsive to the request.

25. The computer-implemented method of claim 24, wherein the interpersonal relationship strength of each interpersonal relationship of the second individual is reduced in proportion to an extent by which the interpersonal relationship total of the second individual exceeds the threshold total for reduction.

\* \* \* \* \*